United States Patent
Leicht

[11] 3,945,762
[45] Mar. 23, 1976

[54] HYDRAULIC GUIDE-WHEEL ADJUSTING MECHANISM

[75] Inventor: Werner Leicht, Stetten, Meersburg, Germany

[73] Assignee: Motoren-und Turbinen-Union Friedrichshafen GmbH, Germany

[22] Filed: July 1, 1974

[21] Appl. No.: 485,023

[30] Foreign Application Priority Data
July 2, 1973   Germany............................ 2333525

[52] U.S. Cl. .................... 417/18; 417/46; 417/407; 91/376 A; 92/138
[51] Int. Cl.² ........................................ F04B 49/00
[58] Field of Search .......... 417/18, 13, 46, 47, 407; 91/376; 92/138; 184/26, 31

[56] References Cited
UNITED STATES PATENTS

| | | | |
|---|---|---|---|
| 1,346,564 | 7/1920 | Sherbondy | 417/47 |
| 2,412,365 | 12/1946 | Sollinger | 415/160 |
| 2,841,321 | 7/1958 | Boyce | 417/13 |
| 2,860,827 | 11/1958 | Egli | 417/407 |
| 2,871,671 | 2/1959 | Bartlett, Jr. | 417/47 |
| 2,929,546 | 3/1960 | Wilkes, Jr. | 92/138 |
| 2,932,168 | 4/1960 | Rockwell | 92/138 |
| 2,933,129 | 4/1960 | Wright | 417/47 |
| 3,033,519 | 5/1962 | Radtke | 415/164 |
| 3,044,683 | 7/1962 | Wollenweber | 417/47 |
| 3,171,420 | 3/1965 | Cowles et al. | 91/376 |

*Primary Examiner*—C. J. Husar
*Attorney, Agent, or Firm*—Craig & Antonelli

[57] ABSTRACT

A hydraulic guide wheel blade adjusting mechanism for the turbine and/or the compressor of an exhaust-gas turbo-supercharger of an internal combustion engine, which includes a control slide valve and servo-pistons; the adjusting mechanism is thereby accommodated within the housing of the turbo-supercharger between the turbine and the compressor.

19 Claims, 5 Drawing Figures

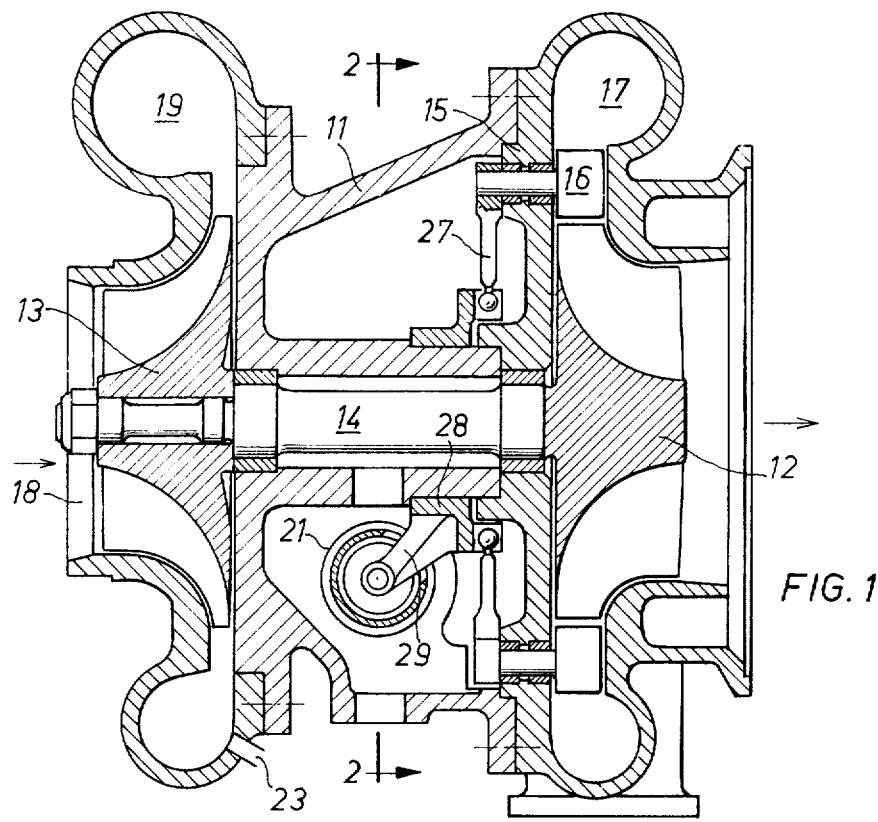
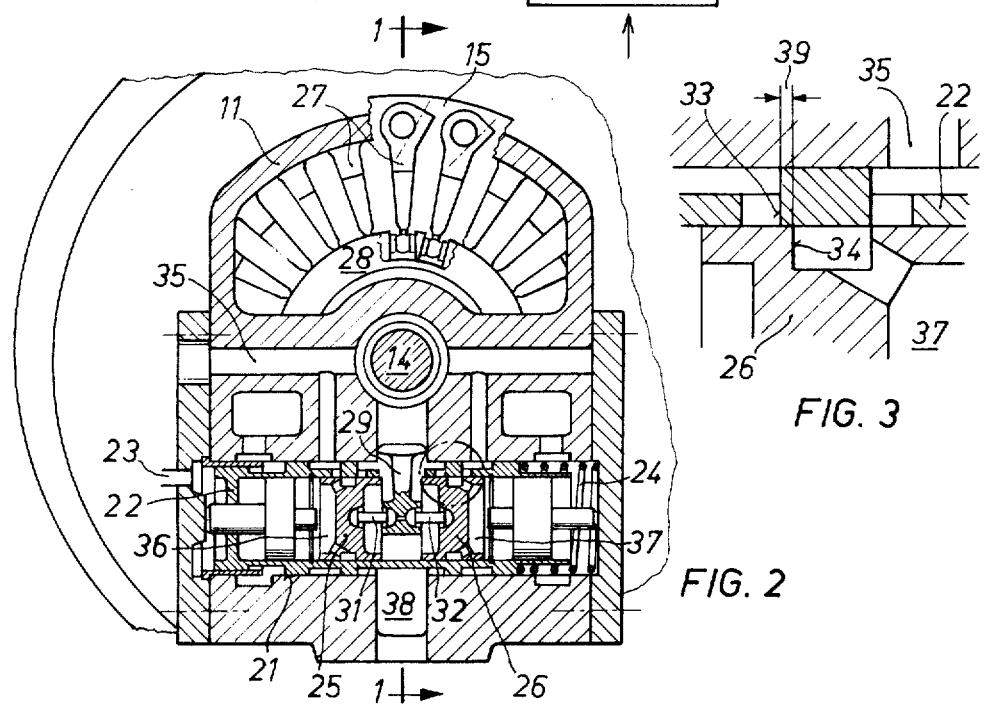

HYDRAULIC GUIDE-WHEEL ADJUSTING MECHANISM

The present invention relates to a hydraulic guide-wheel adjusting mechanism consisting of a control slide valve and of servo-pistons for the turbine or the compressor of the exhaust-gas turbo-supercharger of an internal combustion engine.

Such adjusting mechanisms serve for the automatic adaptation of the supercharge of the internal combustion engine to its different operating conditions and are influenced depending on the posed requirements as a function of the rotational speed, power output, exhaust gas temperature, charging air temperature of the internal combustion engine or the magnitude of the supercharging pressure or air pressure.

Known adjusting mechanisms for the guide blades of exhaust-gas turbo-superchargers are arranged externally of the turbo-supercharger aggregate, for example, at the internal combustion engine and are connected with the guide blades of the turbo-supercharger by way of linkages. These linkages involve an increased susceptibility to trouble and soiling, require servicing expenditures and structural space and are disadvantageous as a result of the required linkage play which in the course of time will increase as a result of wear.

The object of the present invention resides in so arranging the adjusting mechanism that the aforementioned disadvantages are avoided.

The underlying problems are solved in that the adjusting mechanism is arranged according to the present invention on the inside of the housing between the turbine and the compressor.

External linkages between the adjusting unit and the exhaust-gas turbo-supercharger are completely eliminated by the present invention. The adjusting unit itself is accommodated protected against dust and mechanical damages and requires no additional space. One attains by the cooling of the bearing places with the aid of the lubricating oil, which is customary in exhaust-gas turbo-supercharges, the assurance that also the adjusting unit is not heated excessively and is not impaired in its operation.

The supply of a separate auxiliary energy for the servo-piston or pistons is obviated in that the servo-piston during the actuation of the adjusting mechanism is acted upon by the pressure of the lubricating oil circulatory system of the exhaust-gas turbo-supercharger.

An advantageous construction with play compensation is achieved with guide blades rotatably supported in the flange of the guide blade wheel and connected with a common adjusting ring by way of levers in that a cylindrical control slide valve member and two servo-pistons disposed concentrically thereto are arranged in a bore of the housing intermediate the turbine and the compressor, whereby a lever secured at the adjusting ring is disposed between the two servo-pistons which is operatively connected with the servo-pistons by way of two displaceable or movable intermediate members.

If larger forces are required for the actuation of the guide blades, it is proposed according to the present invention that the adjusting mechanism consists of two adjusting units arranged symmetrically with respect to the turbo-supercharger axis and each including one control slide valve and two servo-pistons.

This arrangement may also be used according to a further proposal of the present invention in such a manner that one adjusting unit is coordinated to the guide wheel of the turbine and the second adjusting unit to the guide wheel or the bladed diffusor of the compressor.

Upon actuation of the adjusting mechanism as a function of the supercharging pressure, the control edges of the control slide valve member may overlap the control edges of the servo-piston by a predetermined amount for purposes of suppressing any occurring pressure peaks. The same effect can be attained with the arrangement of two adjusting units in that the return springs of the two control slide valve members are constructed of different strength and/or prestressed differently.

These and further objects, features and advantages of the present invention will become more apparent from the following description when taken in connection with the accompanying drawing which shows, for purposes of illustration only, several embodiments in accordance with the present invention and wherein:

FIG. 1 is a longitudinal cross-sectional view through an exhaust-gas turbo-supercharger of an internal combustion engine with an adjusting unit in accordance with the present invention, taken along line 1—1 of FIG. 2;

FIG. 2 is a cross-sectional view through the exhaust-gas turbo-superchargers arrangement of an adjusting unit according to the present invention, taken along line 2—2 of FIG. 1;

Figure 4:
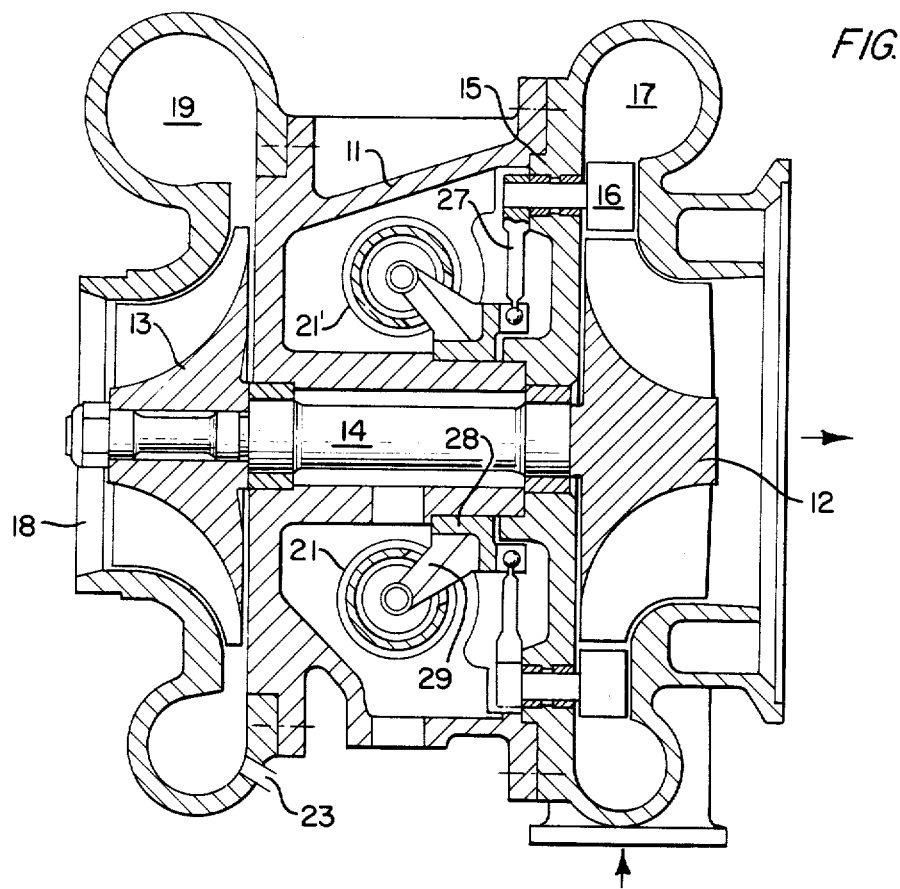
Figure 5:
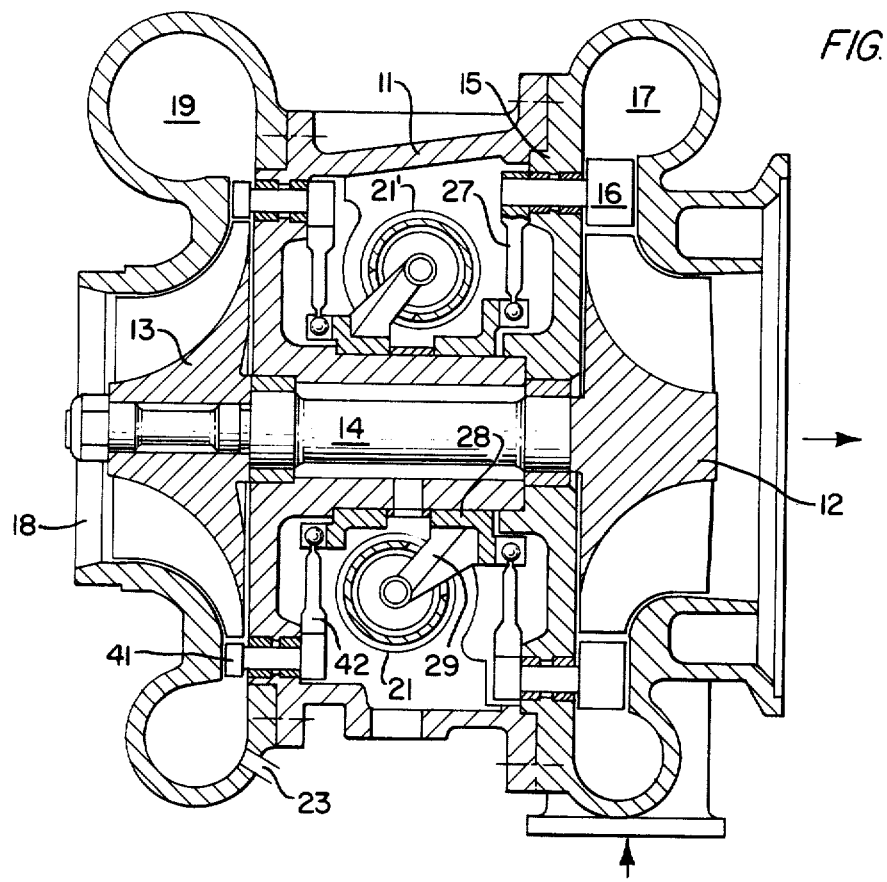

FIG. 3 is a partial detail cross-sectional view, on an enlarged scale, illustrating the construction of the control edges within the area encircled in dash and dot lines in FIG. 2; and FIG. 4 is a cross sectional view through an alternate embodiment of an exhaust-gas turbo-supercharger in accordance with the present invention; and FIG. 5 is a cross-sectional view through a further embodiment of an exhaust-gas turbo-supercharger in accordance with the present invention.

Referring now to the drawing wherein like reference numerals are used throughout the various views to designate like parts, a turbine wheel or rotor 12 and a compressor wheel or rotor 13 are rotatably supported in a housing 11 of the exhaust-gas turbo-supercharger. Both rotors 12 and 13 are securely connected with each other by way of a common shaft 14 so as to rotate in unison with each other. A guide wheel having guide wheel blades 16 rotatably supported in a guide wheel flange 15, is arranged upstream to the turbine wheel 12, as viewed in the flow direction.

The exhaust gases of the internal combustion engine flow by way of an annular channel 17 past the guide wheel blades 16 onto the blades of the turbine wheel 12 and produce thereby a torque driving the compressor rotor 13. The internal combustion engine (not shown) is supercharged with the quantity of air sucked in by way of an air inlet 18 and compressed by the compressor wheel 13. The supercharging pressure which is measurable within a diffusor 19 is used in the illustrated embodiment for the control of the guide blade openings of the turbine wheel.

According to the present invention, an adjusting mechanism 21 is arranged within the housing 11 of the exhaust-gas turbo-supercharger between the turbine and the compressor. This adjusting mechanism 21 consists of a cylindrical control slide valve member 22 which is acted upon with the supercharging pressure by way of a line 23 against the force of a spring 24, and of two servo-pistons 25 and 26 arranged concentrically to the control slide valve member 22. An adjusting ring 28 common to all guide blades 16 and connected with the same by way of levers 27 includes a further lever 29 rigidly secured thereat, which protrudes between the two servo-pistons 25 and 26 and is operatively connected with the same by way of two movable intermediate members 31 and 32.

Control edges 33 are provided at the control slide valve member 22 and control edges 34 are provided at the servo-pistons 25 and 26. By means of these control edges, the pressure oil stemming from the lubricating oil circulatory system for the bearings of the exhaust-gas turbo-supercharger which is fed to the adjusting mechanism through a bore 35, is valved, depending on the position of the control slide valve member 22, into a pressure space 36 or 37 whereas the other pressure space 37 or 36 is connected with the oil return 38. As a result thereof, the servo-pistons 25 and 26 follow the movements of the control slide valve member 22 and displace at the same time the common adjusting ring 28 for the guide blade 16 by way of the movable intermediate members 31 and 32 and by way of the lever 29. It is achieved by the arrangement of an overlap 39 of the control edges 33 of the control slide valve member 22 with respect to the control edges 34 of the two servo-pistons 25 and 26 that occurring pressure fluctuations of the supercharging pressures, as will result with periodically strong fluctuating air removals by the individual cylinders of an engine, will set the control slide valve member 22 into movement, however, these pressure fluctuations are suppressed in their effect on the servo-pistons and therewith also on the guide blade adjustment. By the arrangement of two servo-pistons, additionally every play between servo-pistons and adjusting ring can be eliminated with the aid of the construction of the control edges because the two servo-pistons are continuously stressed against one another.

As shown in FIG. 4, it is possible corresponding to the described arrangement to accommodate within the housing 11 of the exhaust-gas turbo-supercharger two adjusting units 21, 21' arranged symmetrically to one another and to cause both units to act on one and the same adjusting ring also as shown in FIG. 5, it is possible to coordinate one adjusting unit 21 to the guide wheel of the turbine and a second adjusting unit 21' to the guide wheel or the bladed diffusor 41 of the compressor by a lever 42.

While I have shown and described several embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. A hydraulic adjusting mechanism for an exhaust gas turbo-supercharger of an internal combustion engine, the exhaust gas turbo-supercharger including a lubricating oil circulatory system, turbine means, compressor means, means for connecting said turbine means with said compressor means so as to rotate said turbine means and said compressor means in unision, guide wheel blade means provided on at least one of said turbine means and said compressor means for directing the flow of gases through the turbo-supercharger, housing means interposed between said turbine means and said compressor means for housing said connecting means, and means for communicating the lubricating oil circulatory system with the adjusting mechanism, the adjusting mechanism comprising a control slide valve means for the control of the pressure of the lubricating oil system acting upon the adjusting mechanism and servo-piston means operatively connected with said guide wheel blade means for adjusting the position thereof, and means provided in said housing means for accommodating said control slide valve means and said servo-piston means.

2. An adjusting mechanism according to claim 1, wherein said guide wheel blade means includes guide blades, and wherein said guide blades are provided on said turbine means.

3. An adjusting mechanism according to claim 1, wherein said servo piston means includes two servo pistons concentrically disposed with respect to said control slide valve means, the pressure of the oil circulatory system of the exhaust-gas turbo-supercharger acts upon a respective servo-piston during actuation of said adjusting mechanism.

4. An adjusting mechanism according to claim 1, wherein the turbo-supercharger further includes a guide blade wheel having a flange, said guide blade means being rotatably supported within said flange, said adjusting means including a common adjusting ring means, lever means operatively connected with said adjusting ring means, said means for accommodating said control slide valve means and said servo-piston means includes a bore provided in said housing means, and wherein two movable intermediate members are provided for operatively connecting said lever means with said servo-piston means.

5. An adjusting mechanism according to claim 4, wherein said control slide valve means and said servo-piston means each include control edges, and wherein the control edges of the control slide valve means overlap the control edges of the servo-piston means by a predetermined amount.

6. An adjusting mechanism according to claim 4, wherein said servo-piston means includes two servo-pistons concentrically disposed with respect to said control slide valve means, and wherein one end of said lever means is secured to said adjusting ring means, the other end of said lever means is disposed between said two servo-pistons.

7. An adjusting mechanism for an exhaust gas turbo-supercharger of an internal combustion engine, the exhaust gas turbo-supercharger including a lubricating oil circulatory system, turbine means, compressor means, guide wheel blade means provided on at least one of said turbine means and said compressor means for directing the flow of gases through the turbo-supercharger, housing means interposed between said turbine means and said compressor means, the adjusting mechanism comprising a control slide valve means for the control of the pressure of the lubricating oil system acting upon the adjusting mechanism, servo piston means operatively connected with said guide wheel blade means for adjusting the position thereof, the adjusting mechanism being disposed in said housing means between said turbine means and said compressor means, a bladed diffusor provided on said compressor means, means for operatively connecting the adjusting mechanism with said bladed diffusor of the compressor means.

8. An adjusting mechanism for an exhaust gas turbo-supercharger of an internal combustion engine, the exhaust gas turbo-supercharger including a lubricating oil circulatory system, turbine means, compressor means, guide wheel blade means provided on at least one of said turbine means and said compressor means for directing the flow of gases through said turbo-supercharger, housing means interposed between said turbine means and said compressor means, the adjusting mechanism comprising two adjusting unit symmetrically arranged with respect to the turbo-supercharger axis, each of said adjusting units including a control slide valve means for the control of the pressure of the lubricating oil system acting upon the adjusting mechanism, and two servo-piston means operatively connected with said guide wheel blade means for adjusting the position thereof, said two adjusting units being disposed in said housing means between said turbine means and said compressor means.

9. An adjusting mechanism according to claim 8, wherein said guide blade means includes a guide wheel, said guide wheel being provided on said turbine means, said compressor means being provided with at least one of a guide wheel and a bladed diffusor, and wherein one of said adjusting units is operatively connected to said guide wheel of said turbine means, the other of said adjusting units is operatively connected to one of said guide wheel and said bladed diffusor of said compressor means.

10. An adjusting mechanism according to claim 8, wherein said control slide valve means of said two adjusting units are subjected to differing return forces.

11. An adjusting mechanism according to claim 8, wherein return spring means are provided for each control slide valve means, said spring means of said two control valve means being of different strength.

12. An adjusting mechanism according to claim 8, wherein return spring means are provided for each control slide valve means, said return spring means being differently prestressed.

13. An adjusting mechanism for an exhaust gas turbo-supercharger of an internal combustion engine, the exhaust gas turbo-supercharger including a lubricating oil circulatory system, turbine means, compressor means, guide wheel blade means provided on at least one of said turbine means and said compressor means for directing the flow of gases through said turbo-supercharger, housing means interposed between said turbine means and said compressor means, the adjusting means comprising a control slide valve means for the control of the pressure of the lubricating oil system acting upon the adjusting mechanism, and servo-piston means operatively connected with said guide wheel blade means for adjusting the piston thereof, said servo-piston means including two servo-piston concentrically disposed with respect to said control slide valve means, the pressure of the oil circulatory system of the exhaust-gas turbo-supercharger acts upon a respective servo-piston during actuation of said adjusting mechanism, said turbo-supercharger further includes a guide blade wheel having a flange said guide blade means being rotatably supported within said flange, said adjusting means further including a common adjusting ring means, lever means operatively connected with said adjusting ring means, said control slide valve means and said two servo-pistons being disposed within a bore of the housing means between the turbine means and the compressor means, and wherein two movable intermediate members are provided for operatively connecting said lever means with said servo-pistons.

14. An adjusting mechanism according to claim 13, wherein one end of said lever means is secured to said adjusting ring means, the other end of said lever means is disposed between said two servo-pistons.

15. An adjusting mechanism for an exhaust gas turbo-supercharger of an internal combustion engine, the exhaust gas turbo-supercharger including a lubricating oil circulatory system, turbine means, compressor means, guide wheel blade means provided on at least one of said turbine means and said compressor means for directing the flow of gases through the turbo-supercharger, housing means interposed between said turbine means and said compressor means, the adjusting mechanism comprises two adjusting units symmetrically arranged with respect to the turbo-supercharger axis, each of said adjusting units including a control slide valve means for the control of the pressure of the lubricating oil system acting upon the adjusting mechanism, and two servo-piston means operatively connected with said guide wheel blade means for adjusting the position thereof, the adjusting means being disposed in said housing means between said turbine means and said compressor means.

16. An adjusting mechanism according to claim 15, wherein said guide blade means includes a guide wheel, said guide wheel being provided on said turbine means, said compressor means being provided with at least one of a guide wheel and a bladed diffusor, and wherein one of said adjusting units is operatively connected to said guide wheel of said turbine means, the other of said adjusting units is operatively connected to one of said guide wheel and said bladed diffusor of said compressor means.

17. An adjusting mechanism for an exhaust gas turbo-supercharger of an internal combustion engine, the exhaust gas turbo-supercharger including a lubricating oil circulatory system, turbine means, compressor means, guide wheel blade means provided on at least one of said turbine means and said compressor means for directing the flow of exhaust gases through the turbo-supercharger, housing means interposed between said turbine means and said compressor means, the adjusting mechanism comprising two adjusting units, each of said adjusting units includes a control slide valve means for the control of the pressure of the lubricating oil system acting upon the adjusting mechanism and servo-piston means operatively connected with said guide wheel blade means for adjusting the position thereof, the control slide valve means of said two adjusting units are subjected to differing return forces, and wherein said two adjusting units are disposed in said housing means between said turbine means and said compressor means.

18. An adjusting mechanism according to claim 17, wherein return spring means are provided for each control slide valve means, said spring means of said two control slide valve means being of different strength.

19. An adjusting mechanism according to claim 17, wherein return spring means are provided for each control slide valve means, said return spring means being differently prestressed.

* * * * *